Sept. 18, 1934.  H. J. L. FRANK ET AL  1,974,154
LIGHTING PANEL AND UNIT THEREFOR
Filed Dec. 19, 1930   8 Sheets-Sheet 1

INVENTORS
Harrison J. L. Frank &
BY Clarence F. Hollingsworth
ATTORNEY
Francis D. Hardesty

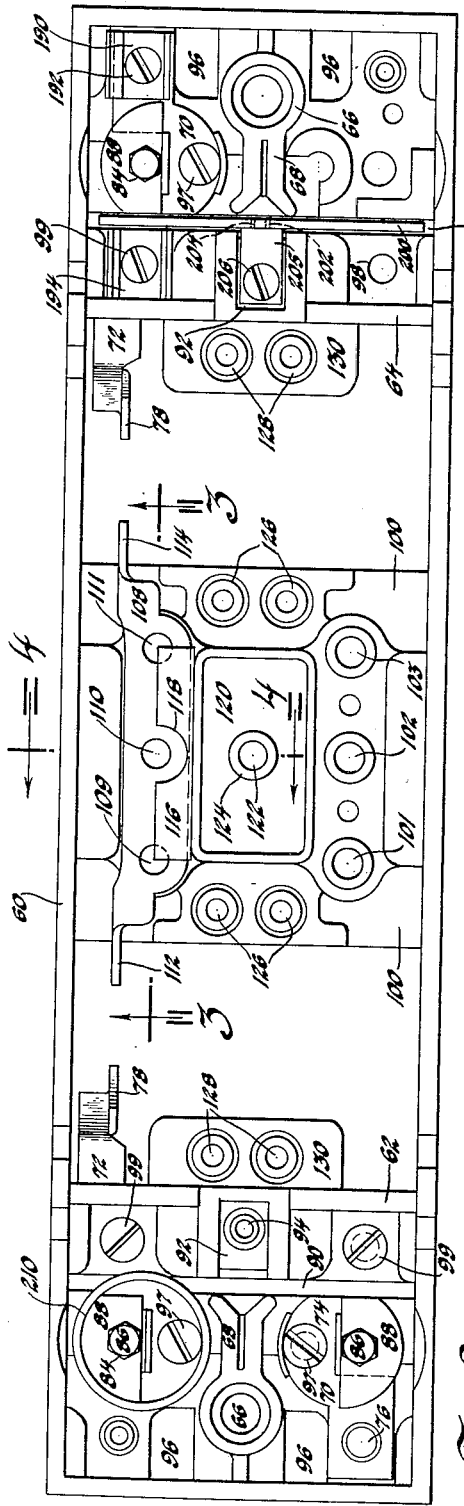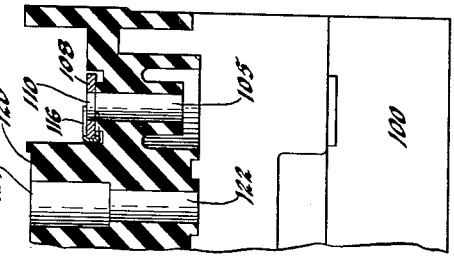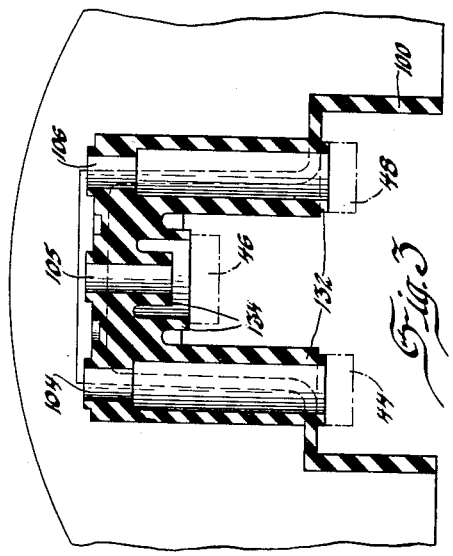

Sept. 18, 1934.  H. J. L. FRANK ET AL  1,974,154
LIGHTING PANEL AND UNIT THEREFOR
Filed Dec. 19, 1930   8 Sheets-Sheet 3
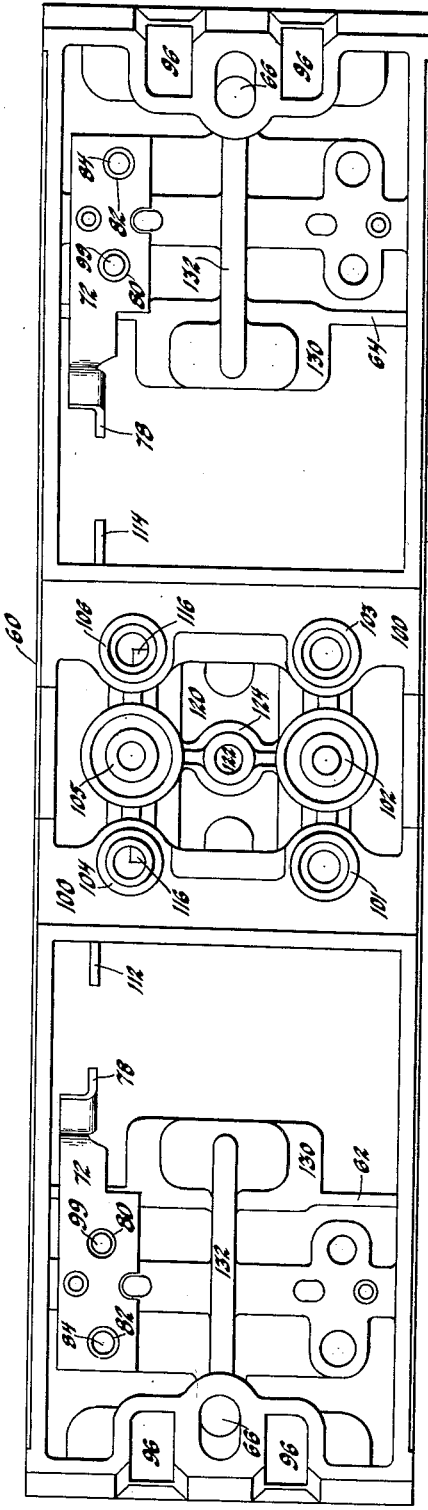
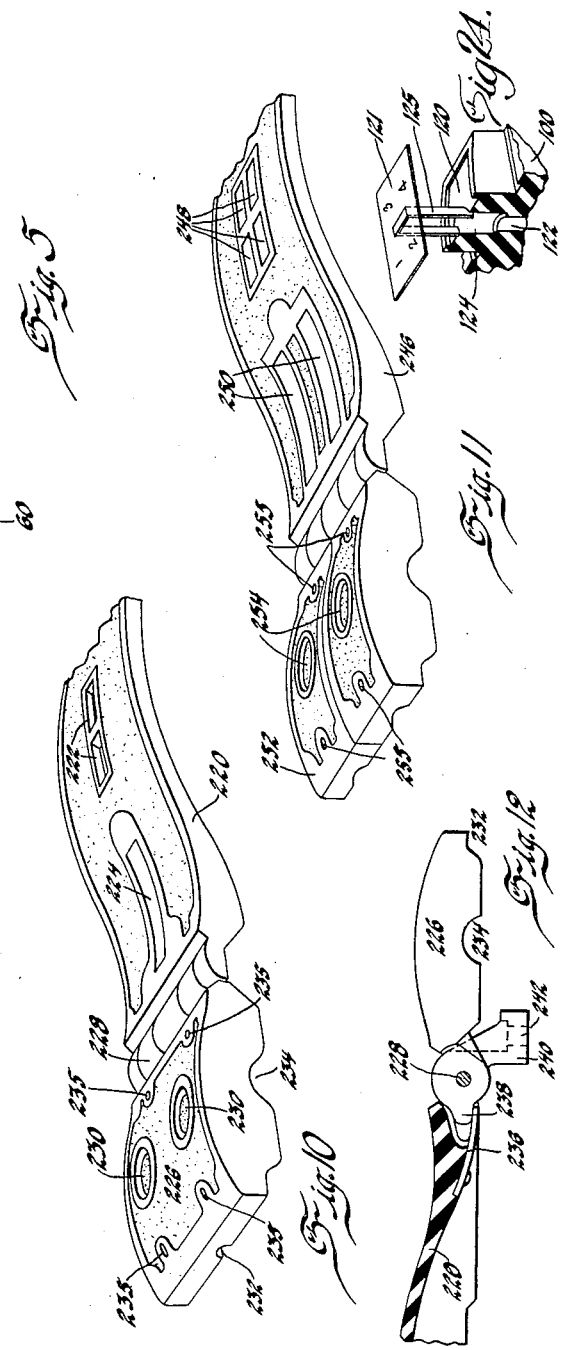
INVENTORS
Harrison J. L. Frank &
BY Clarence T. Hollingsworth
ATTORNEY
Francis O. Hardesty

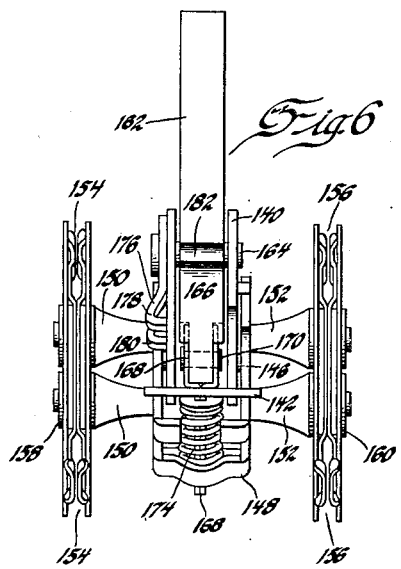
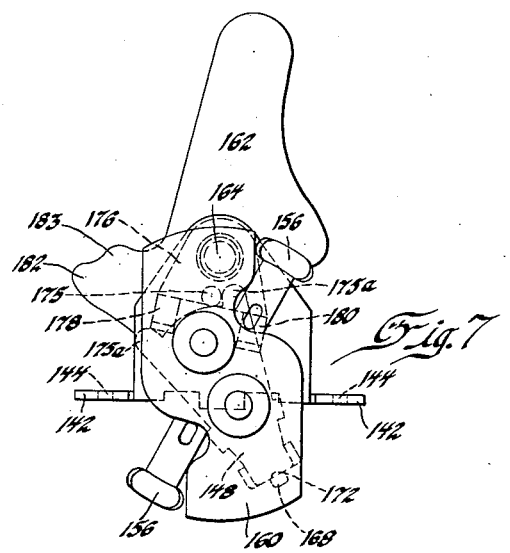
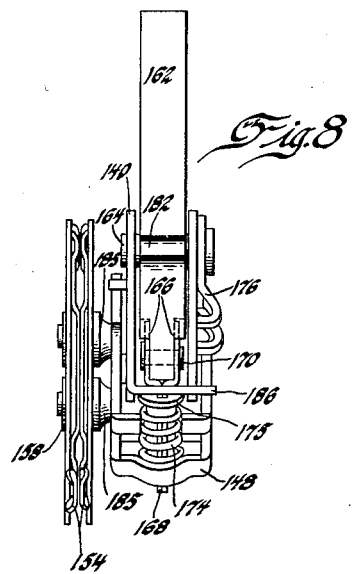
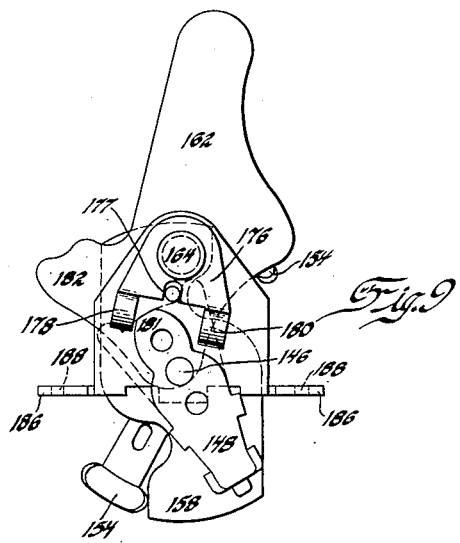

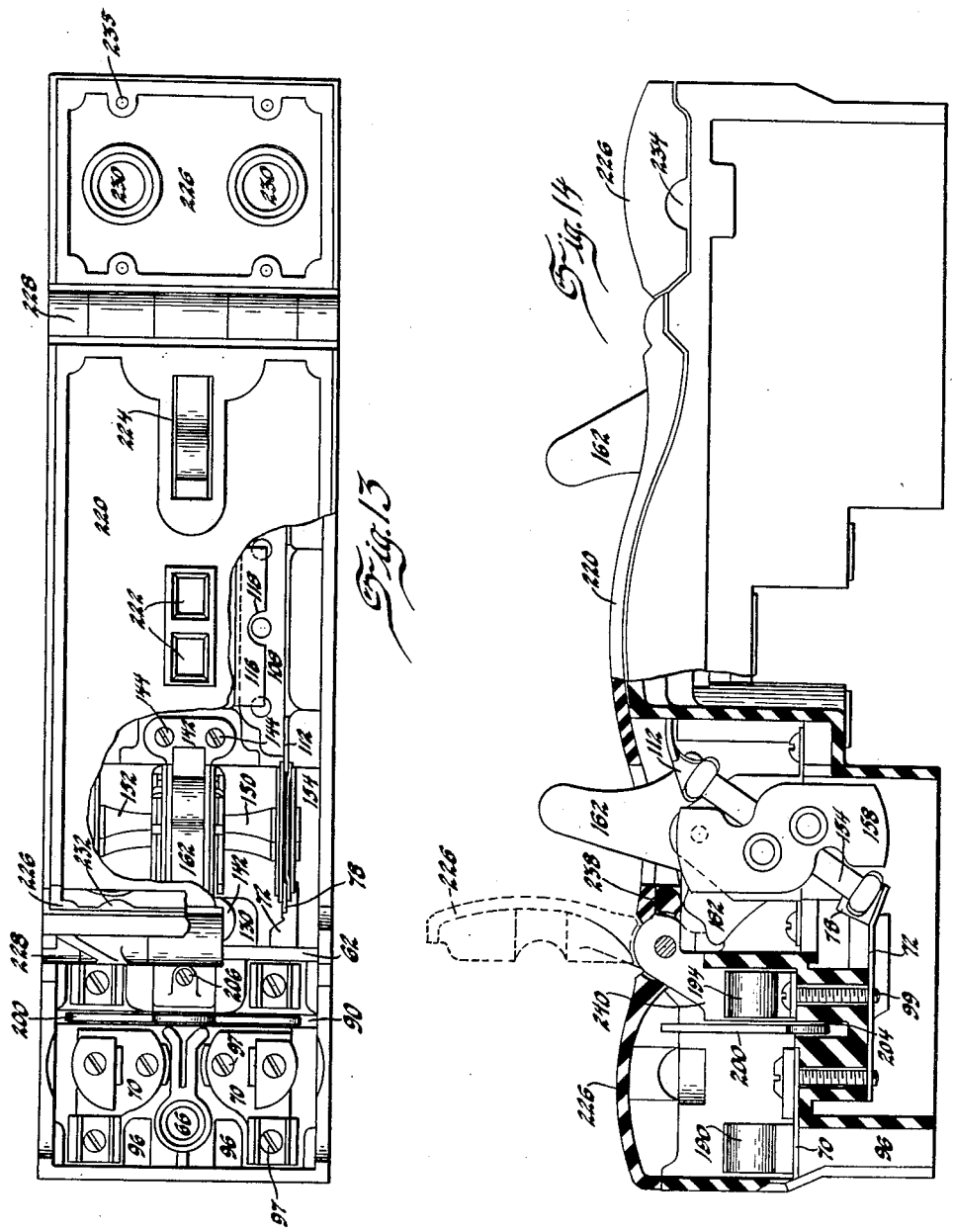

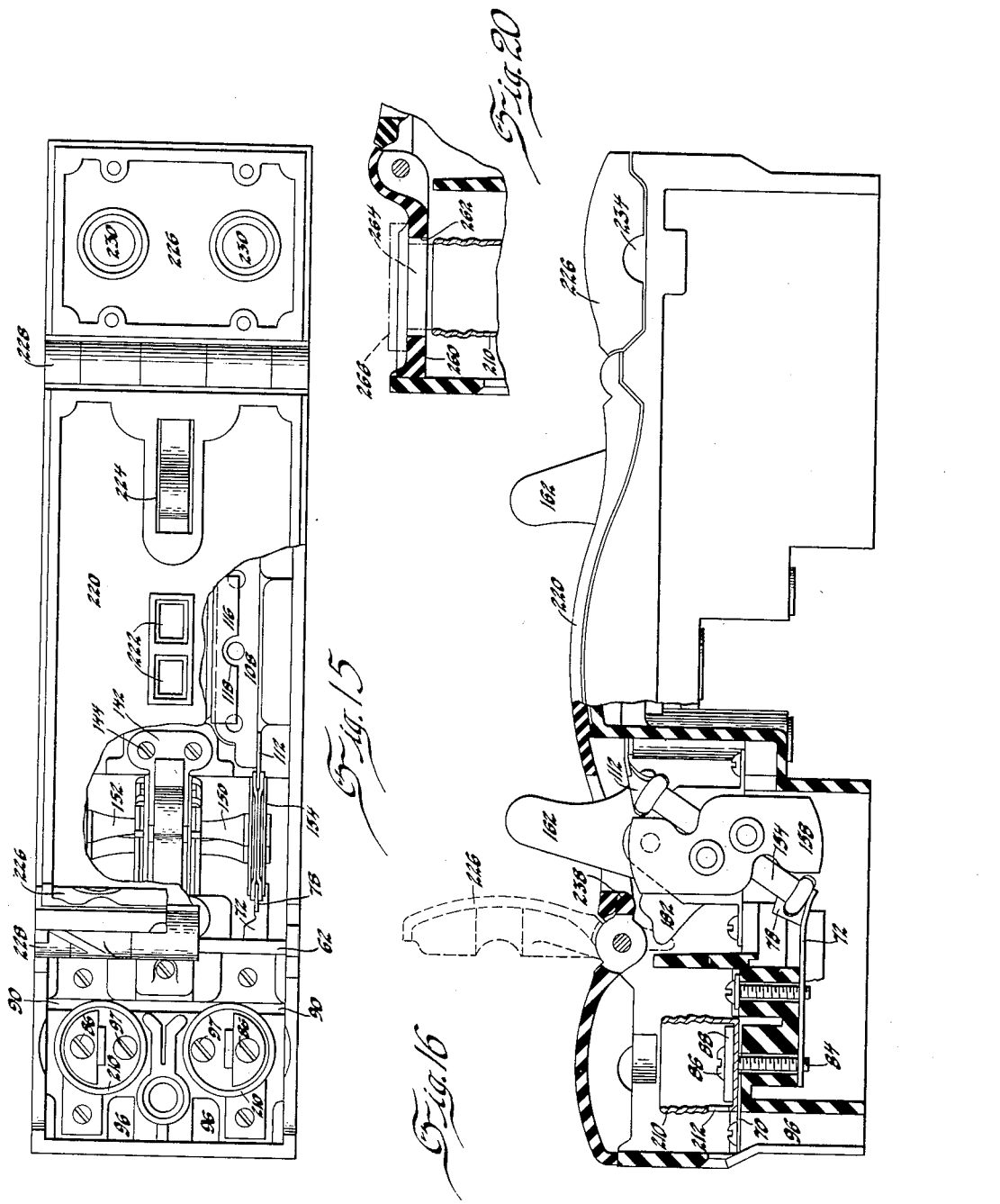

Sept. 18, 1934.     H. J. L. FRANK ET AL     1,974,154
LIGHTING PANEL AND UNIT THEREFOR
Filed Dec. 19, 1930     8 Sheets-Sheet 7
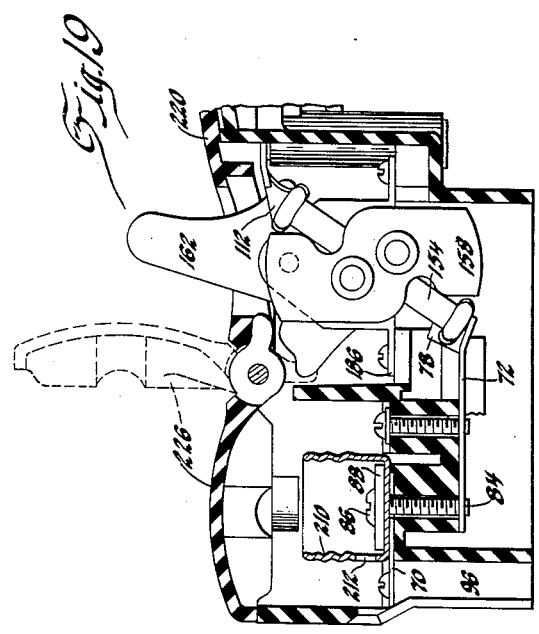
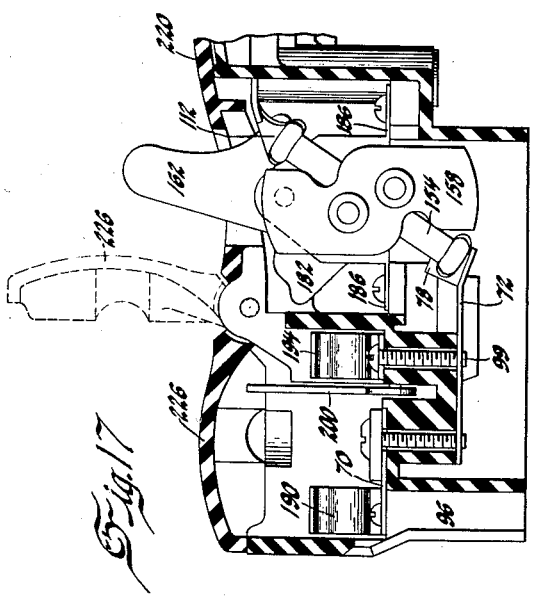
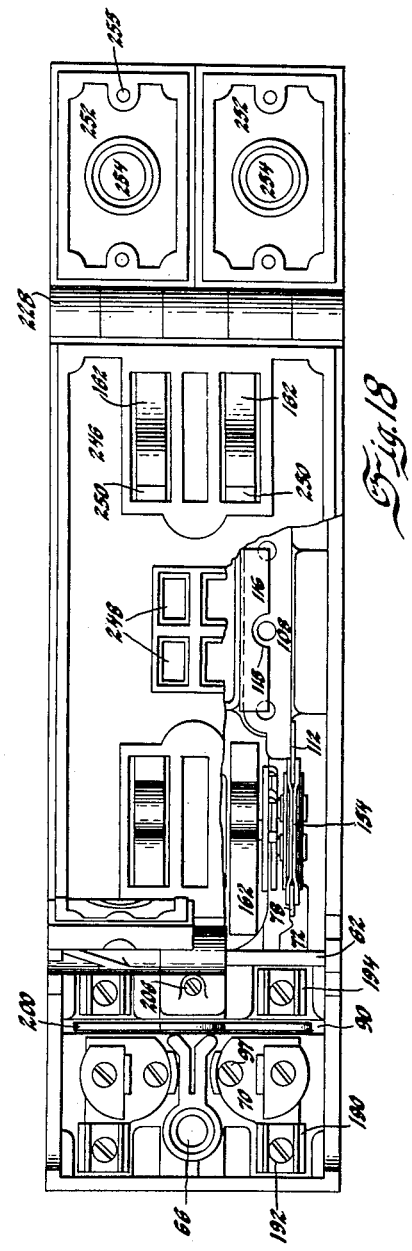
INVENTORS
Harrison J. L. Frank &
BY Clarence T. Hollingsworth
ATTORNEY
Francis D. Hardesty Sept. 18, 1934.  H. J. L. FRANK ET AL  1,974,154
LIGHTING PANEL AND UNIT THEREFOR
Filed Dec. 19, 1930   8 Sheets-Sheet 8
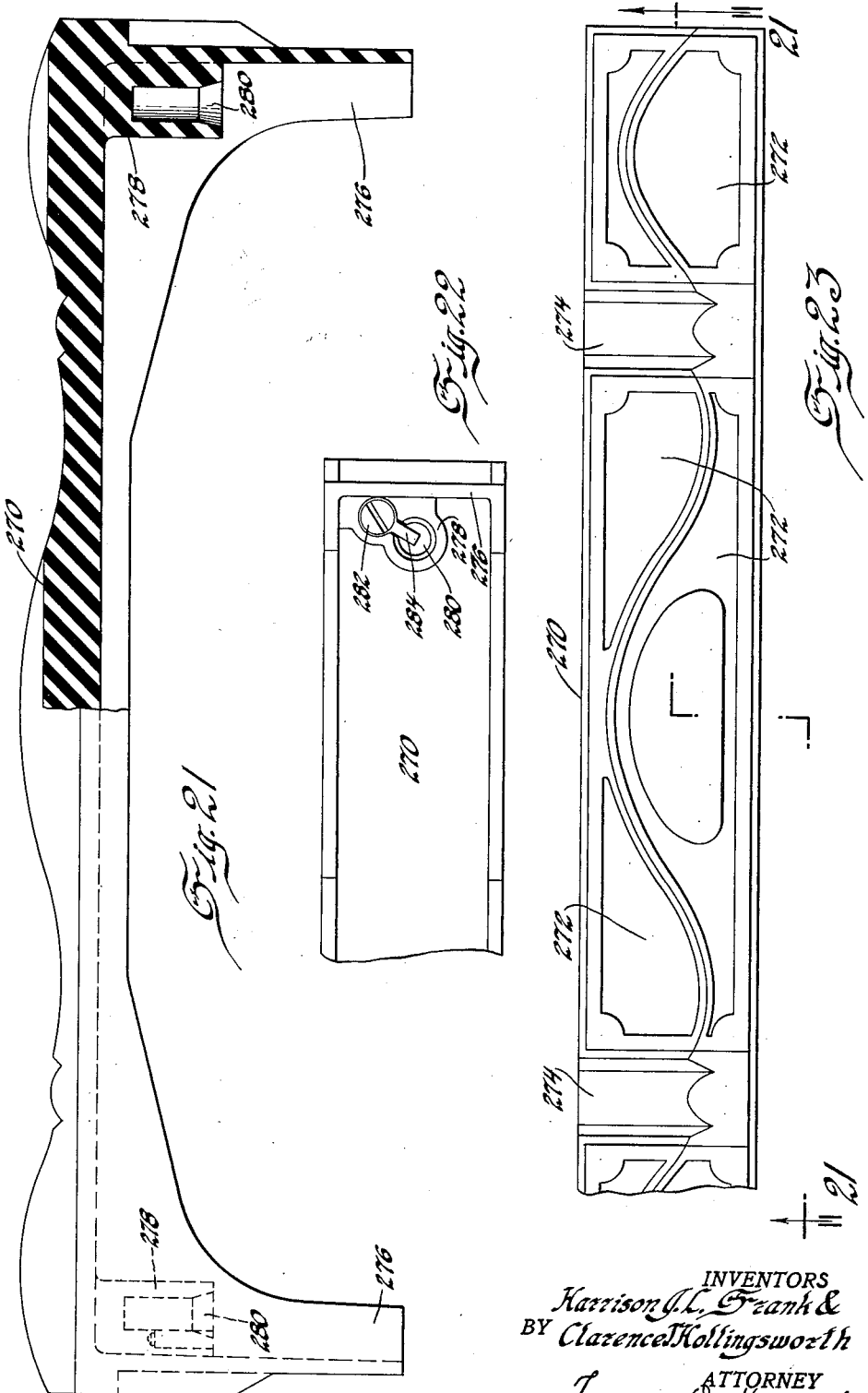
INVENTORS
Harrison J. L. Frank &
BY Clarence Hollingsworth
ATTORNEY
Frances D. Hardester Patented Sept. 18, 1934

1,974,154

UNITED STATES PATENT OFFICE 1,974,154

LIGHTING PANEL AND UNIT THEREFOR

Harrison J. L. Frank and Clarence T. Hollingsworth, Detroit, Mich., assignors to Bulldog Electric Products Company, Detroit, Mich., a corporation of West Virginia Application December 19, 1930, Serial No. 503,546

39 Claims. (Cl. 175—369)

This invention relates to lighting panels and more particularly to lighting panels which are of the type known as sectional, convertible, dead front, and safety type lighting panels.

In the application of Harrison J. L. Frank, Ser. No. 353,343, filed April 8, 1929, there is disclosed a feeder or distribution panel board of the type used for power feeding and embodying many of the advantages of the panel board disclosed in the instant application. Reference may be had to the above identified application for explanation of many of the advantages, uses, functions, and characteristics of the panel board now being claimed, it being remembered, however, that the panel board disclosed in this case is particularly adapted for lighting panels and not designed for power work, as is true of the feeder panel boards of Serial Number 353,343.

The industry has long demanded a lighting panel board of the section convertible dead front safety type and an object of this invention is a panel board of this general type.

The panel board is sectional, that is to say, it is built up of a number of units, all of which are relatively interchangeable without disturbing the ordered appearance of the panel board; all of which can be manufactured or fabricated in the shop and not at the point of installation; and all of which have uniform mounting details so that interchange of units on a panel board and from one panel board to another may be effected without difficulty.

The panel board is convertible, that is to say, a unit originally installed for a plug fuse of one capacity may receive plug fuses of another; a unit that is installed for plug fuses may be converted to receive cartridge fuses; and vice versa. Further, a unit that is constructed to receive double pole switches may receive instead a plurality of single pole switches; and vice versa; and a unit which is originally connected to one phase, of the feeder system may be connected to any other phase, if desired, without difficulty and without disturbing the ordered appearance of the panel board.

The panelboard is of the safety type, that is to say, the fuses cannot be replaced until the current through the unit has been broken and all parts with which the operator may come in contact are "dead". Further, all of the operations described in the foregoing paragraph cannot be performed until and unless the current through the unit which is to be operated upon has been broken by the switch provided for that purpose, so that there is no possibility of the current being broken or any of the parts being manipulated, with possible destruction of the parts and danger to the operator. It must be observed also that the units are constructed so that operations performed on one unit will not necessarily disturb the flow of current through other units and will not disturb the operation of the circuits fed by such other units.

The panelboard is also of the dead front type, that is to say, when in use the panel board as a whole and the units thereof, expose no live parts and consequently expose a complete dead front.

The panel board of this invention also presents certain advantages which are inherent to it and which are not found in other panel boards. For example, access to the panel board which is usually mounted within a box disposed in a wall behind a door and trim, may be had without disturbing the door and trim or the box, regardless of the purpose for which access is desired. For example, replacement and repairs of the parts within the units or replacement or removal of the units may be effected without disturbing the door and trim. For this, and other purposes, the units are provided with channels in the units near the terminal posts, the terminals of the outgoing cables lying in these channels so that the units may be withdrawn without disturbing the door and trim.

Another distinction between the panel board of this invention and other panel boards is its ornamental and enhanced appearance. Wherever possible, the parts have been so designed that no metal, is exposed when the panel board is in operation and no unsightly projections or protuberances are presented. Further, the units are so constructed that all of the circuit control parts and all of the mounting details thereof are concealed from view behind an ornamental cover provided on each unit.

Further, the units have been constructed so that plug or cartridge fuses may be used and interchanged without difficulty. Further, in the event that cartridge fuses are used, fuse ejecting means are provided, such means being shown in the application of Joseph Messing, Ser. No. 421,278, filed January 16, 1930.

The fuse ejecting means is so mounted in the units that it may be readily removed or inserted as desired, this feature being necessary since the ejector is used only with cartridge fuse.

Further, the units are so constructed that rephasing of any or all of them may be effected without disturbing any of the units other than those being rephased without disturbing the door and trim, and only after the current through the unit has been interrupted.

In addition, interlock means have been provided to prevent improper connections to the bus bars being made, such means being so constructed that a circuit control part, hereinafter referred to as a strap, may be connected to only one of the bus bars at a time, thus preventing short-circuiting and injury to the parts.

Further, the units have been constructed so as to receive single pole (S. P.) or double pole (D. P.) switches and the change from one type to the other may be made after the units have been installed and without disturbing units other than those being converted and without disturbing other parts. The ability to interchange single and double pole switches and cartridge and plug type fuses requires the complementary function of being able to change the circuit connections as well, in order to be of real value to the user, as will be observed. Plug fuses can only be used safely up to voltages of 125 volts whereas cartridge fuses may be used up to 250 volts. Single pole switches are only used with a grounded neutral system whereas two poles switches are used on a 3-phase to a single phase system; a 3/2 wire Edison system, etc.

The switches used for the units have been so designed that they will operate to make or break the circuit whether or not the snapping spring normally provided in such switches has failed. That is to say, these switches are of the positive operating or follow thru type.

It is also contemplated to provide each unit with a number of compartments, sections, and cells in which relatively independently operating circuit control parts are provided such localization of the parts serving to localize dangers due to failure of a part, the walls between the cells and sections serving as barriers to insulate the parts in one cell from those in another.

The units have been so constructed that wherever possible, barriers and maximum creepage clearances have been provided, for purposes of insulation and prevention of danger.

The units are also provided with covers having windows thru which circuit legend-indicating means may be viewed.

The covers also may have test holes thru which testing means for the fuses may be inserted, whereby testing of fuses may be effected without removing a cover from a unit and without removing a fuse while it is in circuit.

Further, ventilating holes, finger hole notches, etc., are provided on the covers for obvious purposes.

Further, the connections between unit parts and the ends of load cables are such that they are accessible when the cover is removed and only then, and without disturbing any unit other than the one being considered and without disutrbing other parts of the panel.

Further, the unit covers are interlocked with the unit switches so that the covers may not be removed without all of the switches being moved to their "off" positions, and in this way access to the interior of the unit is not possible until and unless the switches have been moved to circuit opening position.

Further, it is impossible to throw the switch to the on position while the door giving access to the fuses is open, and further the act of opening the door automatically throws the switch to the off position.

Further, some of the units may be provided with hinged doors forming part of the cover and serving to cover and conceal the fuses, others of the units being provided with shields forming part of the cover and having openings thru which plug fuses may be threaded into the screw shells, the shields, however, serving to conceal all but the upper flanged edge or ring of the fuse plug, whereby the danger of the operator's fingers coming in contact with live parts is prevented, although the plug fuses are themselves visible.

Further, the covers are made up of hingedly connected sections provided with spring means which operate to complete the closing or opening operation of a section and also to maintain sections in closed or open position, as desired.

Further, the covers of the units are provided with round depressions of ornamental appearance which may be knocked out to expose plug fuses located in the units below these holes. This construction accommodates the desires of those who wish to have their plug fuses visible from the front of the panel board.

There also has been provided for the panel board, end filler pieces of ornamental appearance, which serve to cover the electrical connections at the ends of the panel board and which serve to fill the gap between the end one of a row of units and the end of the box in which the units are mounted, these end filler pieces also being interchangeable as will be understood.

Still further objects will readily occur to those skilled in the art upon reference to the following description and the accompanying drawings in which Fig. 1 is a front elevation view of a panel board embodying the invention.

Fig. 2 is a front elevation view of the stripped chassis of a unit, the cover, switches and fuses being removed; the lower right hand corner of the unit showing the molded body forming the major part or foundation of the chassis, the lower left hand portion showing a corner of the standard chassis, the upper right hand corner showing a standard chassis equipped for cartridge fuses and the upper left hand corner showing a standard chassis equipped for plug fuses.

Figs. 3 and 4 are sections on lines 3—3 and 4—4 of Fig. 2.

Fig. 5 is a rear elevation view of a unit, the lower portion showing the body and the upper portion showing the standard chassis.

Figs. 6 and 7 are side and plan views of a double pole switch for use with the unit.

Figs. 8 and 9 are similar views of a single pole switch.

Fig. 10 shows a portion of a cover for use with a double pole switch unit.

Fig. 11 is a similar view of a cover for use with a single pole switch unit.

Fig. 12 shows the hinged connection between the parts of the cover of Fig. 11.

Figs. 13 and 14 are respectively, a front section view and a bottom plan view of a double pole cartridge fuse unit, parts being shown in section.

Figs. 15 and 16 are similar views of a double pole plug fuse unit.

Figs. 17 and 18 are similar views of a single pole cartridge fuse unit.

Fig. 19 is a front section view of a single pole plug fuse unit.

Fig. 20 is a detail section showing a modified form of cover, namely, a shield form.

Fig. 21 is a sectional view of an end filler piece as if on the line 21—21 of Fig. 23.

Fig. 22 is a partial rear view of the same.

Fig. 23 is a front view of an end filler piece.

Fig. 24 shows the mounting of the circuit legent indicating card.

Figure 1:
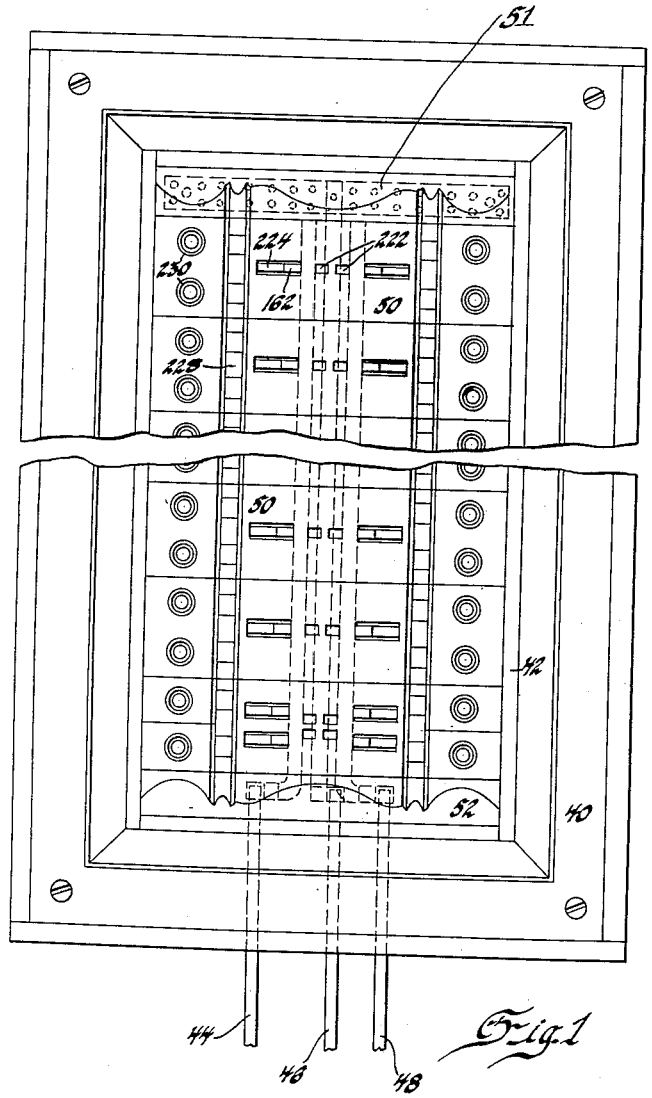

System and panel board as a whole

In Fig. 1 there is disclosed a trim plate 40 secured to an aperture in a wall by trim clamps, such as are shown in the application of Harrison J. L. Frank, Serial No. 334,962, filed January 25, 1929. Disposed in back of the plate is a sheet steel box 42 containing the panel of the invention. A plurality of bus bars 44—46—48, three as shown, extend vertically in the box and to these bus bars the units 50 forming the panel board are electrically connected, there also being a neutral strap 51.

Each of the units is provided with fuses and switches thru which the current is fed from the bus bars to the load, and each unit is provided with means for indicating, by suitable legends, the circuits controlled by the unit. Some of the units are equipped for plug fuses, and some for cartridge fuses, some for single pole switches, and some for double pole switches; and in this manner, great variation in circuit arrangement is made possible.

Further, the units are interchangeable, one with the other, without disturbing the ordered appearance of the panel board, as a whole; they are reversible on a horizontal central axis; they are so constructed that access to the mounting means when interchange is desired, access to the fuses when they are to be interchanged or replaced; and access to the switches, when they are to be interchanged or replaced, is not possible until the switches have been moved to their circuit breaking position. In addition, the units are so constructed as to be ornamental of appearance, individually and together, to form an attractive panel board.

The panel board also is provided with end pieces 52, one at each end of the board, which are curved and tapered to finish the board and to enhance its appearance, and such pieces are to be considered as part of the invention.

Each of the units includes a chassis permanently provided with mounting means, bus connecting means, switch supporting means, and means to support the fuse receiving means; and various appurtenances such as switches and fuse receiving means. Of the foregoing, the chassis is standard to all units, and the appurtenances are selected for various conditions and then mounted on the chassis to form a complete unit.

The standard chassis (Figs. 2, 3, 4 and 5)

The standard chassis includes a molded body 60 of insulation material, relatively wide and short, and having partitions 62 and 64 forming three compartments, the two outer ones of which receive the fuses, the terminal lugs on the ends of the outgoing cables, and the mounting means, and the inner one of which receives the switches, the circuit legend or indicating means, and the bus bar connecting means.

The end compartments are identical and will now be described. A hollow vertical barrel 66 of insulating material formed integral with the body provides means thru which may be projected a bolt which is to be threaded into a mounting plate in the box 42 to secure the unit in place, it being observed that there are two such barrels, one in each end compartment. The barrels are symmetrically positioned in the units so that the latter may be reversed 180 degrees on a central axis, provided with projecting fins 68 which divide each compartment into sections, in each of which is supported a fuse receiving means, the fins and barrels insulating the sections and the fuses therein from each other.

In each section, on the floor of the body, is secured an L-shaped strap 70 of copper and this strap overlies a second strap 72, also of copper, and secured to the under surface of the body. The strap 70 is provided with tapped holes 74 and 76, and the strap 72 is provided with a bent up portion 78, forming a stationary switch contact, and tapped holes 80 and 82. Threaded into hole 82 thru the body, and out of electrical contact with strap 70, the latter being cut away at this point, is a bolt 84 whose head is adapted to be engaged by the tip contact of the ordinary plug fuse.

In each compartment there is provided a long, narrow, and deep slot 90 between the fins 68 and a shelf 92, the latter having a hole therein in which is disposed a tapped bushing 94. Further, into each section there leads an opening 96 which projects downwardly and outwardly thru the bottom and end of the unit to afford an entranceway for cables whose ends are to be connected to the fuse receiving means in the sections by a screw 97 threaded into tapped hole 74 of the strap 70.

Further, in each section is a hole 98, in alignment with tapped hole 80 of strap 72 and thru which a screw 99 is passed.

The center or large compartment of the unit is provided with a central portion 100 of insulation, molded integral with the body, and providing in the compartment, a pair of duplicate sections. The central portion 100 is provided with two sets of bores, six in all, and numbered 101 to 106 inclusive. The bores are arranged so that when a unit is placed over the bus bars, pairs of them will align with the bars, and thru selected ones of these bores connecting screws are to be passed and threaded into suitably spaced tapped holes in the bars.

Further, the configuration of a unit is such that intermediate bores 102 and 105 are shorter than the outer bores 101, 104, and 103, 106, which themselves are less in height than is the unit, so that the bus bars are enclosed, partially, within a unit, and staggered from one another, as disclosed in Fig. 3.

Disposed on and secured to the portion 100 and over each row of bores is a copper strap 108 having apertures 109, 110, 111, aligned with the barrels and having its ends formed as at 112 and 114 to form a stationary switch contact, these ends being aligned with the contacts 78 of the straps 72. Slidably mounted in grooves in the portion 100 over each strap 108, are plates 116 each of which has a central notch 118 therein and each of which is of length equal to the distance between the centers of the outermost holes 109—111.

It will be seen that the plate 116 is movable so as to expose only one of the holes 109—111, partially concealing the other two. In this manner access to more than one bus bar in each side of a unit thru the holes and bores in strap 108 and portion 100 is prevented.

Between the rows of bores, portion 100 is provided with an upstanding shelf 120 upon which a card 121 bearing legends, which indicate the circuit members, may be placed. Further, shelf 120 is bored as at 122, and counterbored at 124, to provide a bore thru which a screw may be placed to maintain the intermediate bus bar in position, the head of such screw being disposed down deep in the counterbore so as to be effectively shielded. Such a support is desirable since in the grounded neutral type of system, the switches and fuses are connected to the outside bus bars only and consequently if the holes 122 were not provided there would be no means of supporting the middle bus bar in position. Further, in the counterbore, there may be disposed a U spring device 125, adapted to retain the card 121 in its place upon the shelf 120.

The portion 100 is provided, on a lower level, with holes and tapped bushings 126 aligned with similar holes and bushings 128 in shelves 130 which project from the partitions 62 and 64, and these tappings are to receive switch mounting screws, as will be described.

Throughout the chassis, wherever possible, the body is provided with barrier formations between parts of opposite polarity, and the failure to describe any of these, specifically, is not to be construed as a dedication or disclaimer of them. Some of these barriers may be seen at 66, 68, 120, etc. and others at 132, etc. (Fig. 5).

Further, from Figs. 3 and 4, it will be noticed that there is provided a series of concentric rings 132, 134 against which the bus bars are supported. This construction keeps the bus bars from resting upon the flat surface of the insulated material. By raising the bus bars from the insulated material in this manner and by providing pits and grooves near the concentric rings, we prevent the formation of a continuous layer or shelf for the collection of dust, moisture or other conducting material which might otherwise short circuit these parts by what is commonly known as "creepage".

It will also be seen that the bus bars are in one compartment, the switches are in other compartments, and the fuses are in still other compartments, and the compartments are isolated from one another by barriers.

The central section is bulged outwardly, as shown in Fig. 3, to provide a greater quantity of material at this point, the bulge and its curves also serving to enhance the appearance of the unit.

*Switches (Figs. 6, 7, 8 and 9)*

For use with the standard chassis described in the foregoing, switches shown in detail in Figs. 6-9 are provided, and such switches will now be described.

The double pole switch of Figs. 6 and 7, includes a frame stamping 140 having mounting lugs 142 in each of which are the mounting holes 144, spaced and adapted to cooperate with bushings 126 and 128 in the chassis, bolts being threaded into holes 126 and 128 for switch mounting purposes. Pivotally mounted on the frame at 146 is a U-shaped stamping 148 and two pairs of horns 150 and 152 are secured to opposite sides of the U 148. To these horns are secured the movable contacts 154, 156, of the switches, the contacts being shielded over all but their tips by sheets of insulation 158 and 160.

A handle 162 of sturdy construction is pivotally secured to the frame 140 at 164 and the lower end of the handle is cut away as at 166 to receive the U-shaped end of a two part link 168, the connection between them including a pin 170 straddling the U end and the handle. The other end of the two part link is disposed within an aperture 172 in the U 148, and the link is surrounded by a coiled spring 174 to form a snap switch, such as are highly desirable in constructions of this character. The two parts of the link 168 are held together by a tubular rivet 175 which also serves as a washer for the end of the coiled spring 174, as disclosed.

The frame 140 is provided with a pin 175 which passes therethru and thru the handle 162, one end of the pin lying between two teeth or extensions 175a formed on the extremity of one side of the U and the other lying in a slot (not shown) in the frame, the ends of the slot limiting the pin in its movement. When the handle is moved, the pin engages one or the other of the teeth 175a to move the U past "dead center", whereupon the spring 174 will function to move the U to the proper and desired position.

In order to provide a positive follow through operation to the switch, that is to say, an operation wherein the switch contacts can be moved by the handle, even though the spring be broken, an element 176 is secured to the frame by the handle securing means 164, the element having a notch 177 surrounding the pin 175 so that the handle 162 and the element move as a unit. The element 176 has a pair of fingers 178 and 180 which engage the tooth like portion 181 of the U and serve to force the U one way or another, as the handle is moved, if the spring has not already moved the U and the contacts carried by it. This action, of course, takes place after the pin 175 has engaged one of the teeth 175a of the U, and has moved the U past "dead center". It will be seen that fingers 178 and 180 are far enough apart to prevent their acting on the operating yoke or U piece in a "gear tooth" manner, or in such a manner that they would prevent the spring from moving the yoke more rapidly than the handle is moved.

The handle 162 has thereon a shoulder or horn 182, humped at 183, which forms an interlock with the unit cover, as will be described in detail below. When the switch handle is moved so that its contacts 154, 156 connect stationary contacts 78 and 114 of the chassis, i. e. to make the circuit, horn 182 is in its uppermost or cover locking position, whereas when the handle is moved to its circuit breaking position, the horn 182 is in its lowermost position.

The single pole switch illustrated in Figs. 8 and 9, is very much like the double pole switch, except that the contacts 154 are mounted closer to the U member, there being a pair of short horns 185 like those at 150, 152 of the D. P. switch, and except that the mounting legs 186 are bent to one side of the U, so that the mounting hole 188 in each of them will coincide with only one each of the chassis bushings 126 and 128.

Since two S. P. switches are used in the space formerly occupied by one D. P. switch, the mounting lugs and holes in the switches are so made that they coincide with the switch mounting holes 126 and 128 in the chassis and this feature is an important part of the invention.

It will be observed that the switches for use with the unit are stripped, that is to say, they have no built-in stationary contacts, but include, as contacts, only a movable contact arm.

Fuse receiving means (Fig. 2)

For use with a standard chassis, two forms of fuse receiving means are provided, either of which may be used in an end compartment of the chassis, the selection depending upon the type of fuse, cartridge or plug, which is to be used. Each of the fuse receiving means and each fuse is mounted in a section of the compartment, and it will be seen that four independent, relatively insulated, fuse receiving means and fuses are provided for each unit.

A cartridge fuse receiving means, shown best in the upper right hand corner of Fig. 2, includes a pair of fuse clips of well known form, one of which 190 is mounted upon a strap 70, being electrically and mechanically connected thereto by a screw 192, disposed within the tapped bushing under the hole 76 of the strap, and the other of which 194 is mounted directly upon the body and held in place by the screw 99 which goes through hole 98 and is threaded into tapped hole 80 of the strap 72.

Since two cartridge fuses are used in one end compartment of a unit, a common ejecting means for them may be provided, and the means disclosed in the application of Joseph Messing, 421,278, Jan. 16, 1930, has been shown. This form of ejector includes an inverted T-shaped sheet of hard and tough insulating material, such as compressed fiber, indicated at 200, and vertically disposed in the slot 90 between clips 194 and the straps 70.

The ejector is provided with a hole 202 through which passes a boss 204 bent up from the mounting strap 205 which is secured to the shelf 92 by a bolt 206 threaded into a tapped bushing in line with the hole 94 on such shelf. The ejector can be swung to one side or another, to and fro on its pivot, to engage the under surface of one or the other of the cartridge fuses adapted to be disposed in the clips and to eject them. Further, the ejector being of insulated material, forms a barrier between the straps 70 and clips 194, and since these parts are of opposite polarity, a barrier is quite useful at this point.

A plug fuse receiving means includes a screw shell 210 which is held against the body and a strap 70 in a section of an end compartment by the bolt or screw 84, and the fiber piece 88, the head 86 of the bolt 84 forming a tip contact for the plug fuse. The screw 97 threaded into the strap 70 electrically, mechanically connects the shell to the strap, these screws also serving as binding screws for the ends of cables (not shown) which enter the unit through the holes 96 in the body, this binding function being used with a plug or a cartridge fuse. (Further the shell is provided with a slot, not shown, through which the cable end may pass.) Further, the ejector described above is not provided when plug fuses are used, these last being removed in the ordinary manner.

It will be noted that the binding device described above is like the one described in the prior copending application of Harrison J. L. Frank, Ser. No. 49,709, filed Aug. 12, 1925.

Covers (Figs. 10–12)

For use with the parts previously described, two forms of covers have been disclosed, Fig. 10 showing a portion of a D. P. cover and Fig. 11 showing a similar portion of a S. P. cover, it being understood that preferably, though not necessarily, the covers are symmetrical about a central point.

The D. P. cover of Figs. 10 and 12 includes a central portion 220 of a size to fit the center compartment of the standard chassis. Centrally disposed in the cover are two windows 222 through which may be viewed legends provided on a card which is to be mounted on the shelf 120 of the chassis. The cover also has slots 224 through which may project and move the handles 162 of the D. P. switches of Figs. 6 and 7.

The end portions 226 of the cover are hinged to the central portion by piano type, integral hinges, such as those shown at 228, so as to be movable therewith, and each end portion is provided with circular depressions or "knockouts" 230, aligned with the plug fuses, when these last are in place, the "knockouts" being removed, if desired, to expose the plug fuses. A finger hold notch 232 is provided in each end, and a ventilating notch 234 is provided on each lower side margin of the end pieces. Further, holes 235 in the covers permit the testing of cartridge or plug fuses while they are in circuit and unexposed.

Riveted to the under surface of the central portion are leaf springs 236 (Fig. 12), which tend to retain the end pieces 226 in their fully closed or fully open positions, and which tend to complete an opening or closing movement of them, these springs operating on an extension or flange 238 also cooperates with the shoulder 182 on the switch handle 162 to form an interlock between them, the relative position of these parts being such that when the switch is "on", its shoulder 182 is under and adjacent the flange 238, preventing the raising of the cover end piece 226, but when the switch is "off", the shoulder 182 is at a distance from the flange 238, permitting free movement of the cover end piece.

The extension 238 on the end of the cover engages the shoulder 182 of the switch handle and as the cover 226 is raised the extension 238 of the cover engages the shoulder 182, depressing it and moving the handle to the off position. This extension 238 rides over the hump 183 on the shoulder 182 and only throws the switch handle just over center and the spring completes the function, throwing the switch to the off position.

It will be observed that the shoulder 182 rests against the extension 238 to maintain cover 226 in the closed position while the switch is on. This is desirable because it assists the spring 236 on the cover in maintaining the door in the closed position.

It will further be noticed that when the door is open and the switch is in the off position the extension 238 lies in the path of the shoulder 182 so that the switch cannot be thrown to the on position until the extension is removed from this path by closing the door 226.

Further, lugs 240 formed integral with the cover central portion, at each end of the latter, are provided with apertures 242 through which may be passed the bolts 206 which are used, also, to mount the ejectors 200 in place, the lugs 240 seating on the shelves 92 of the body. It will be seen that access to the heads of bolts 206 is not permitted unless the end pieces 226 be raised and this is not possible until the switches are moved to their open position.

Further, the covers the provided with curves and ornamented surfaces to make the units attractive, individually and in ensemble.

The S. P. cover, shown in Fig. 11 is very much like the D. P. cover of Fig. 10, differing therefrom only in several minor respects. For instance, its central portion 246 is provided with four windows 248, two pairs of switch handle slots 250, and two pairs of end pieces 252, each of which may move separately with respect to its neighbor and each of which has a "knockout" at 254 and test holes 255.

As is true of the D. P. cover, the S. P. cover has leaf springs for closing and opening the end pieces and for maintaining them so closed and open, flanges adapted to cooperate with the shoulders 182 on the switch handles for interlock purposes, and mounting lugs like those at 240 of the D. P. cover.

All forms of covers resemble each other in appearance, so that they may be interchanged or grouped, on standard chassis, as desired without disturbing the ordered appearance of the panel board.

*Modifications (Figs. 13–20)*

Having described the standard chassis (Figs. 2–5) and the various forms of switches (Figs. 6–9), the various forms of fuse receiving means (Fig. 2), and the various forms of covers (Figs. 10–12), the various modifications which combine selected ones of the foregoing with a standard chassis will now be described.

*D. P. Cartridge fuse unit (Figs. 13 and 14)*

The D. P. cartridge fuse unit includes the standard chassis, a set of fuse clips in each section of an end compartment, an ejector for the cartridge fuses disposed in the clips, double pole switches in each central compartment, mounted between the central portion 100 and the end compartment barrier and a cover like that of Fig. 10.

The circuit path for this modification is as follows:

Current from a preselected one of the bus bars 44—46—48 is brought to one of the straps 108 by a screw (not shown) whose head rests on the strap to make contact therewith and whose threaded end is disposed in a tapped hole of the bus bar. From the strap contact 112 or 114, the current goes through one of the contacts 154—156 of the D. P. switch to a contact 78 of a strap 72. Then it goes through the screw 99 to the clip 194, through fuse (not shown) to the clip 190, then to the strap 70, and to binding screw 97, from whence it goes to the load through the cable (not shown) whose end is connected to strap 70 by screw 97. The return circuit is similar to the outgoing circuit, returning by way of the fuse between the fuse clips, a strap 72, the other side of the switch and to the other strap 108, from whence it goes to a different bus bar than the one heretofore mentioned in this paragraph.

*D. P. Plug fuse unit (Figs. 15 and 16)*

The D. P. plug fuse unit also includes the standard chassis, a screw shell in each section of an end compartment, and double pole switches mounted as described above.

The circuit path for this modification is as follows: From bus bar selected, current goes to a strap 108, contact 112, switch contact 184, contact 78 and to strap 72, from where it goes thru screw 84 to the tip contact of the plug fuse (not shown), then thru the fuse to the shell 210 and binding screw 97, and to the cable end connected to the latter. The return path is similar, the return being to a different bus than the one mentioned above as used for the feeding path.

*S. P. Cartridge fuse unit (Figs. 17 and 18)*

The S. P. cartridge fuse unit also includes a standard chassis, a set of fuse clips in each section of an end compartment, four S. P. switches, an ejector for the fuses, and a cover of the form of Fig. 11.

A circuit path for this modification is as follows: Current goes from a selected bus bar to strap 108, contact 112, switch contact 154, contact 78, strap 72, screw 99, clip 194, thru the fuse (not shown), to clip 190, to screw 192, strap 70, screw 97 and to the cable held in place by the latter.

It will be seen that in the units the switches and their mounting details are so designed that two S. P. switches are mounted to occupy the same space that is occupied by one D. P. switch in a D. P. unit, this feature being desirable for interchange of switches when demanded by circuit changes.

*S. P. Plug fuse unit (Fig. 19)*

The S. P. plug fuse unit also includes a standard chassis, a screw shell in each end compartment section, four S. P. switches and a cover of the form of Fig. 11.

A circuit path for this form is as follows: Current goes from a selected bus bar thru strap 108, contact 112, switch contact 154, contact 78, strap 72, screw 84, thru the plug fuse, to shell 210 and screw 97 and to the cable end connected to the latter.

In Fig. 20, there is illustrated a modified form of cover or shield for use with plug fuses. In this form the end piece 226 (or 252) is replaced by an insulating shield 260 hingedly connected to the central portion 220 (or 246). The shield is provided with holes 262 aligned with the screw shells 210 and of a size such that a fuse plug 264 may be threaded therethru and into the shell, the holes being smaller in diameter, however, than the outer flanged ring 266 of the fuse plug. Thus, fuse replacement may be effected thru the shield without exposing the live parts in the unit to the operator and without the switches being thrown to their off position, while at the same time, the fuses when in place, are visible from the front of the panel board.

*End pieces (Figs. 21–23)*

Each end filler piece includes a body 270, provided with ornamental configurations 272 and 274 which harmonize with the details on the units next adjacent to it, and legs 276 projecting therefrom towards the mounting place in the panel box. Each leg is provided, inside the filler piece, with bosses 278 which are bored, as at 280 to receive the ends of studs (not shown) projecting forwardly from the mounting plate. Secured to each boss, by a screw 282, is a spring 284 having a portion disposed in the bore to engage the stud frictionally when the filler piece is snapped onto the studs, these parts being the sole securing means for the pieces.

Now having described the invention and the preferred form of embodiment thereof, it is to be understood that the said invention is to be limited, not to the specific details herein set forth, but only by the scope of the claims which follow:

What we claim is:

1. In a lighting panel unit adapted to be mounted over a plurality of bus bars, a plurality of groups of circuit control parts and devices in said unit, a plurality of means to connect individual ones of said bus bars to individual groups, the means, the groups and the bus bars being so arranged that any group may be connected to any bus bar, as desired, and an interlock device for preventing the means from being connected to the bus bars in such a fashion that a group is connected to more than one bus bar, at any one time.

2. In a lighting panel unit adapted to be mounted over a plurality of bus bars, a body molded of insulating material and having integral therewith walls providing fuse-containing end compartments, switch-containing intermediate compartments, and a central section of insulating material, the latter overlying the bus bars and containing means for connecting electrical parts of the unit to the bus bars, the central section having on its rear wall a plurality of channels in which the bus bars are adapted to be disposed, the central section having a row of bores therethrough aligned with and extending from the front of the unit to the channels, the section having on its front surface, a separate metallic conducting strap overlying all of the bores in a row and having apertures in alignment with the bores, through each of which apertures and through each of which bores a bus bar connecting means may be disposed, and an interlock device for preventing the disposition of bus bar connecting means in more than one aperture and bore in a row at any one time.

3. In a lighting panel unit, a body molded of insulating material and having, fuse-containing, enclosed, end compartments, each end compartment being divided into sections by a barrier wall of insulating material, and fuse receiving means and a fuse in each section.

4. In a lighting panel unit, a body molded of insulating material and having fuse-containing, enclosed, end compartments, each end compartment being divided into sections by a barrier wall of insulating material, and fuse receiving means and a fuse in each section, the barriers between sections being provided with bores therethrough leading from front to rear of the units, for the reception of mounting means for the unit, the mounting means having manipulating portions accessible from the front of the units, the units being provided with covers for said manipulating portions, the covers being movable, to expose the manipulating portions, only when the circuit through the adjacent fuses in the unit in interrupted.

5. In a lighting panel unit, a body molded of insulating material and having fuse-containing, enclosed, end compartments, each end compartment being divided into sections by a barrier wall of insulating material, and fuse receiving means and a fuse in each section, the fuse-receiving means including a strap 70 on the front wall of the unit, a cable terminal, a binding screw 97 for the latter and threaded into said strap from the front of the unit, a bolt 86 secured to the unit and having its head facing the front thereof to form a tip contact, a mounting screw threaded into the strap and a second mounting screw secured to the unit, the mounting screws being for the purpose of securing fuse clips to the unit, and the binding screw and the bolt being adapted to secure a fuse shell to the unit, as desired, the bolt and the second mounting screw being insulated from the strap and being electrically connected to a bus bar, and the binding screw and the first mounting screw being electrically connected to the terminal of a load cable.

6. In a lighting panel unit, a body having a central portion and fuse containing end compartment, switches carried by said central portion, and fuses in the end compartments, and a removable cover for said body including a central section and movable end sections hingedly connected thereto, the end sections having ornamental depressions or "knockouts" which may be "knocked out" to expose the fuses in the units, the central section having slots through which the handles of the switches may project, the handles and the end sections having cooperating formations which interlock so that the end sections cannot be swung on their hinges to expose the fuses until the adjacent switch handles have been moved to switch "off" position.

7. In a lighting panel unit, a plurality of cable terminal binding posts, a fuse connected to each post, a stationary switch contact connected to each fuse and another stationary switch contact connected to a bus bar, a plurality of switch mounting means adjacent said contacts so positioned as to mount a plurality of single pole stripped switches, each of which connects one each of the aforementioned stationary contacts, or to mount a multipole stripped switch adapted to connect pairs of the stationary contacts, the various switch assemblies for use with the device having similarly and designedly aligned switch mounting details, whereby interchange of stripped switches in a unit may be readily effected, so as to convert a unit from single pole circuit use to multipole circuit use, the mounting means having manipulating portions accessible from the front of the panel board, so that conversion may be effected completely, from the front, the units having insulating covers over said manipulating portions which cannot be moved so as to expose the latter unless and until the electrical connection between the manipulating portions and the bus bar has been interrupted.

8. In a lighting panel unit adapted to be mounted over a plurality of bus bars, a plurality of groups of circuit control parts and devices in said unit, and a plurality of means to connect individual ones of said bus bars to individual groups, the means, the groups and the bus bars being so arranged that any group may be connected to any bus bar, as desired, the connecting means having manipulating portions accessible from the front of the panel board so that connection may be effected completely from the front, the units having insulating covers over said manipulating portions which cannot be moved so as to expose the latter unless and until the electrical connections between the groups and the bus bars connected thereto have been interrupted.

9. In a lighting panel unit adapted to be mounted over a plurality of bus bars, a body molded of insulating material and having integral therewith walls providing fuse-containing end compartments, switch-containing intermediate compartments, and a central section of insulating material, the latter overlying the bus bars and containing means for connecting electrical parts of the unit to the bus bars, the central section having on its rear wall a plurality of channels in which the bus bars are adapted to be disposed, the central section having a row of bores therethrough aligned with and extending from the front of the unit to the channels, the section having on its front surface a conducting strap overlying all of the bores in a row and having apertures in alignment with the bores, through each of which apertures and through each of which bores a bus bar connecting means may be disposed, and an interlock device for preventing the disposition of bus bar connecting means in more than one aperture and bore at any one time, the interlock comprising a sliding member so formed as to expose only one complete aperture in any one of its positions.

10. In a lighting panel unit adapted to be mounted over a plurality of bus bars, a body molded of insulating material and having fuse-containing end compartments, switch-containing intermediate compartments, and a central section of insulating material, the latter overlying the bus bars and containing means for connecting electrical parts of the unit to the bus bars, the central section having a row of bores therethrough aligned with and extending from the front of the unit to the bus bars, and through which bus bar connecting means may be disposed, the section having on its front surface, a separate metallic conducting strap overlying all of the bores in a row and having apertures in alignment with the bores, through each of which a bus bar connecting means may be disposed, and an interlock device for preventing the disposition of bus bar connecting means in more than one aperture and bore at any one time.

11. In a lighting panel unit adapted to be mounted over a plurality of bus bars, a body molded of insulating material and having fuse-containing end compartments, switch-containing intermediate compartments, and a central section of insulating material, the latter overlying the bus bars and containing means for connecting electrical parts of the unit to the bus bars, the central section having a row of bores therethrough aligned with and extending from the front of the unit to the bus bars, and through which bus bar connecting means may be disposed, the section having on its front surface, a separate metallic conducting strap overlying all of the bores in a row and having apertures in alignment with the bores, through each of which a bus bar connecting means may be disposed, and an interlock device for preventing the disposition of bus bar connecting means in more than one aperture and bore at any one time, the interlock comprising a sliding member so formed as to expose only one complete aperture in any one of its positions.

12. In a lighting panel unit adapted to be mounted over a plurality of bus bars, a body molded of insulating material and overlying the bus bars and containing means for connecting electrical parts of the unit to the bus bars, the body having a row of bores therethrough aligned with and extending from the front of the unit to the bus bars, and through which bus bar connecting means may be disposed, the body having on its front surface, a separate metallic conducting strap overlying all of the bores in a row and having apertures in alignment with the bores, through each of which a bus bar connecting means may be disposed, and an interlock device for preventing the disposition of bus bar connecting means in more than one aperture and bore at any one time.

13. In a lighting panel unit adapted to be mounted over a plurality of bus bars, a body molded of insulating material and overlying the bus bars and containing means for connecting electrical parts of the unit to the bus bars, the body having a row of bores therethrough aligned with and extending from the front of the unit to the bus bars, and through which bus bar connecting means may be disposed, the body having on its front surface, a separate metallic conducting strap overlying all of the bores in a row and having apertures in alignment with the bores, through each of which a bus bar connecting means may be disposed, and an interlock device for preventing the disposition of bus bar connecting means in more than one aperture and bore at any one time, the interlock comprising a sliding member so formed as to expose only one complete bore in any one of its positions.

14. In a lighting panel unit adapted to be mounted over a plurality of bus bars, a body molded of insulating material and having integral therewith walls providing fuse containing end compartments, switch-containing intermediate compartments, and a central section of insulating material, the latter overlying the bus bars and containing means for connecting electrical parts of the unit to the bus bars, the central section having a front shelf upon which circuit legend indicia may be disposed, and having a cover thereover provided with windows through which the indicia may be viewed, the central section having an additional bore aligned with the central channel, and having a supporting bolt receiving counterbore therein, adapted to be concealed by the indicia bearing means.

15. In a lighting panel unit, a body molded of insulating material and having fuse-containing, enclosed, end compartments, each end compartment being divided into sections by a barrier wall of insulating material, and fuse receiving means and a fuse in each section, the fuse-receiving means including a strap on the front wall of the unit, a cable terminal, a binding screw 97 for the latter and threaded into said strap from the front of the unit, a bolt 86 secured to the unit and having its head facing the front thereof to form a tip contact and insulated from the strap, a mounting screw threaded into the strap and a second mounting screw secured to the unit, the mounting screws being for the purpose of securing fuse clips to the unit, and the binding screw and the bolt being adapted to secure a fuse shell to the unit, as desired, each compartment being provided with an insulating cartridge fuse ejector member, pivotally mounted in a slot in the compartment, and serving as a barrier between the strap and a cartridge fuse clip, the ejector being mounted upon a front shelf in the compartment.

16. In a lighting panel unit, a body molded of insulating material and having fuse-containing, enclosed, end compartments, each end compartment being divided into sections by a barrier wall of insulating material, and fuse receiving means and a fuse in each section, the fuse-receiving means including a strap on the front wall of the unit, a cable terminal, a binding screw 97 for the latter and threaded into said strap from the front of the unit, a bolt 86 secured to the unit and having its head facing the front thereof to form a tip contact, a mounting screw threaded into the strap and a second mounting screw secured to the unit, the mounting screws being for the purpose of securing fuse clips to the unit, and the binding screw and the bolt being adapted to secure a fuse shell to the unit, as desired, the bolt and the second mounting screw being insulated from the strap and being electrically connected to the bus bar through a switch, and the binding screw and the first mounting screw being electrically connected to a load cable, the heads of the screws and the bolts being accessible from the front of the unit.

17. In a lighting panel unit, a body molded of insulating material and having fuse-containing, enclosed, end compartments, each end compartment being divided into sections by a barrier wall of insulating material, and fuse receiving means and a fuse in each section, the fuse-receiving means including a strap on the front wall of the unit, a cable terminal, a binding screw 97 for the latter and threaded into said strap from the front of the unit, a bolt 86 secured to the unit and having its head facing the front thereof to form a tip contact, a mounting screw threaded into the strap and a second mounting screw secured to the unit, the mounting screws being for the purpose of securing fuse clips to the unit, and the binding screw and the bolt being adapted to secure a fuse shell to the unit, as desired, the bolt and the second mounting screw being insulated from the strap and being electrically connected to a bus bar, and the binding screw and the first mounting screw being electrically connected to a load cable, the heads of the screws and the bolts being accessible from the front of the unit, the units being provided with covers for said heads, movable, to expose the heads only when the circuit through the fuses is interrupted.

18. In a lighting panel unit, a body molded of insulating material and having fuse-containing, enclosed, end compartments, each end compartment being divided into sections by a barrier wall of insulating material, and fuse receiving means and a fuse in each section, the fuse-receiving means including a strap on the front wall of the unit, a cable terminal, a binding screw 97 for the latter and threaded into said strap from the front of the unit, a bolt 86 secured to the unit and having its head facing the front thereof to form a tip contact and insulated from the strap, a mounting screw threaded into the strap and a second mounting screw secured to the unit, the mounting screws being for the purpose of securing fuse clips to the unit, and the binding screw and the bolt being adapted to secure a fuse shell to the unit, as desired, each compartment being provided with an insulating cartridge fuse ejector member, pivotally mounted in a slot in the compartment, and serving as a barrier between the strap and a cartridge fuse clip, the ejector being mounted upon a front shelf in the compartment, the units being provided with covers secured thereto by screws threaded into the front shelves of the units, these screws serving as securing and supporting means for the ejectors.

19. In a lighting panel unit, a body molded of insulating material and having fuse-containing, enclosed, end compartments, each end compartment being divided into sections by a barrier wall of insulating material, and fuse receiving means and a fuse in each section, the fuse-receiving means including a strap on the front wall of the unit, a cable terminal, a binding screw 97 for the latter and threaded into said strap from the front of the unit, a bolt 86 secured to the unit and having its head facing the front thereof to form a tip contact and insulated from the strap, a mounting screw threaded into the strap and a second mounting screw secured to the unit, the mounting screws being for the purpose of securing fuse clips to the unit, and the binding screw and the bolt being adapted to secure a fuse shell to the unit, as desired, and a second strap secured to the rear surface of the front wall of the unit, and electrically and threadedly connected to the bolt and the second mounting screw.

20. In a lighting panel unit, a body molded of insulating material and having fuse-containing, enclosed, end compartments, each end compartment being divided into sections by a barrier wall of insulating material, and fuse receiving means and a fuse in each section, the fuse-receiving means including a strap on the front wall of the unit, a cable terminal, a binding screw 97 for the latter and threaded into said strap from the front of the unit, a bolt 86 secured to the unit and having its head facing the front thereof to form a tip contact and insulated from the strap, a mounting screw threaded into the strap and a second mounting screw secured to the unit, the mounting screws being for the purpose of securing fuse clips to the unit, and the binding screw and the bolt being adapted to secure a fuse shell to the unit, as desired, and a second strap secured to the rear surface of the front wall of the unit, and electrically and threadedly connected to the bolt and the second mounting screw, and having an end formed as a stationary switch contact.

21. In a lighting panel unit adapted to be mounted over a plurality of bus bars, together with a plurality of similar units to form a complete panel, a body having a central portion and fuse-containing end compartments, switches carried by said central portion, and fuses in the end compartments, and a cover for said body including a central section and movable end sections hingedly connected thereto, the end sections having ornamental depressions or "knockouts" which may be "knocked out" to expose the fuses in the units, the central section having slots through which the handles of the switches may project, the handles and the end sections having cooperating formations which interlock so that the end sections cannot be swung on their hinges to expose the fuses until the adjacent switch handles have been moved to switch "off" position, the covers having means whereby they may be mounted on the units, the mounting means being so positioned that they are inaccessible unless and until the adjacent switch handles have been moved to switch "off" position.

22. In a lighting panel unit, a body having a central portion and fuse-containing end compartments, switches carried by said central portion, and fuses in the end compartments, and a cover for said body including a central section and movable end sections hingedly connected thereto, the end sections having ornamental depressions or "knockouts" which may be "knocked out" to expose the fuses in the units, the central section having slots through which the handles of the switches may project, the handles and the end sections having cooperating formations which interlock so that the end sections cannot be swung on their hinges to expose the fuses until the adjacent switch handles have been moved to switch "off" position, the covers having means whereby they may be mounted on the units, the mounting means being so positioned that they are inaccessible unless and until the adjacent switch handles have been moved to switch "off" position, and until the adjacent end sections have been opened.

23. In a unit adapted to be mounted over a plurality of bus bars, a plurality of groups of circuit control parts, a plurality of means to connect individual ones or individual pairs of said groups to individual bus bars, the means, the groups, and the bus bars being so arranged that any group or any pair of groups may be connected to any bus bar, as desired, and an interlock device for preventing the means from being connected to the bus bars in such a fashion that a bus bar is connected to more than one group at any one time, or to more than one pair of groups at any one time, or in such a fashion that a group is connected to more than one bus bar, at any one time.

24. In a unit adapted to be mounted over a plurality of bus bars, a section having a row of bores therethru leading to the bus bars, through each of which bores a bus bar connecting means may be disposed, and an interlock device for preventing the disposition of bus bar connecting means in more than one bore in the row at any one time.

25. In a unit adapted to be mounted over a plurality of bus bars, a section having a row of bores therethrough leading to the bus bars, through each of which bores a bus bar connecting means may be disposed, and an interlock device for preventing the disposition of bus bar connecting means in more than one bore in the row at any one time, the interlock device comprising a sliding member so formed as to expose only one complete aperture in any one of its positions.

26. In a unit, a fuse-containing compartment, a fuse therein, a switch-containing compartment, a switch therein, a fixedly positioned cover having a portion covering said switch compartment and a portion hingedly connected thereto and covering the fuse-containing compartment, the cover having a slot through which the handle of the switch projects, the handle and the latter mentioned cover portion having cooperating formations which interlock so that the latter mentioned cover portion cannot be swung on its hinge to expose the fuse until the switch handle has been moved to off position.

27. In a unit, a fuse-containing compartment, a fuse therein, a switch-containing compartment, a switch therein, a fixedly positioned cover having a portion covering said switch compartment and a portion hingedly connected thereto and covering the fuse-containing compartment, the cover having a slot through which the handle of the switch projects, the handle and the latter mentioned cover portion having co-operating formations which interlock so that the latter mentioned cover portion cannot be swung on its hinge to expose the fuse until the switch handle has been moved to off position, the latter mentioned cover portion having an ornamental "knockout" which may be knocked out to expose the fuse in the unit.

28. In a unit, a fuse-containing compartment, a fuse therein, a switch-containing compartment, a switch therein, a fixedly positioned cover having a portion covering said switch compartment and having a portion hingedly connected thereto and covering the fuse containing compartment, the cover having a slot through which the handle of the switch projects, the handle and the latter mentioned cover portion having co-operating formations which interlock so that the latter mentioned cover portion cannot be swung on its hinge to expose the fuse until the switch handle has been moved to off position, the latter mentioned cover portion having an ornamental "knockout" which may be knocked out to expose the fuse in the unit, the "knockout" being too small to permit withdrawal of the fuse through it.

29. In a unit, a fuse-containing compartment, a fuse therein, a switch-containing compartment, a switch therein, a fixedly positioned cover having a portion covering said switch compartment and having a portion hingedly connected thereto and covering the fuse-containing compartment, the cover having a slot through which the handle of the switch projects, the handle and the latter mentioned cover portion having co-operating formations which interlock so that the latter mentioned cover portion cannot be swung on its hinge to expose the fuse until the switch handle has been moved to off position, and means for securing the cover to the body of the unit, the means being so positioned that access thereto is impossible unless and until the switch handle is moved to off position.

30. In a unit, a fuse-containing compartment, a fuse therein, a switch-containing compartment, a switch therein, a fixedly positioned cover having a portion covering said switch compartment and having a portion hingedly connected thereto and covering the fuse-containing compartment, the cover having a slot through which the handle of the switch projects, the handle and the latter mentioned cover portion having co-operating formations which interlock so that the latter mentioned cover portion cannot be swung on its hinge to expose the fuse until the switch handle has been moved to off position, and means for securing the cover to the body of the unit, the means being so positioned that access thereto is impossible unless and until the switch handle is moved to off position and until the aforementioned cover portion is swung to expose the fuse.

31. In a lighting panel unit adapted to be mounted over a plurality of bus bars, a plurality of permanently mounted stationery contacts for switches, and a plurality of permanently mounted mounting means for switches, the contacts being positioned to receive the movable contact arms of stripped S. P. switches or stripped D. P. switches interchangeably, these switches being free of stationary contacts and comprising movable contact arms and operating means therefor only, the mounting means being positioned to cooperate with mounting parts of S. P. switches or D. P. switches interchangeably, and convertible means for connecting certain of the stationary permanent contacts to any desired bus bar, the S. P. switches and the D. P. switches for interchangeable use with the unit having similar contact arms suitably positioned to engage the permanent stationary contacts of the unit, and having similar mounting means suitably positioned to cooperate with the permanent switch mounting means of the unit.

32. In a lighting panel unit adapted to be mounted over a plurality of bus bars, a plurality of permanently mounted stationary contacts for switches, and a plurality of permanently mounted mounting means for switches, the contacts being positioned to receive the movable contact arms of stripped S. P. switches or stripped D. P. switches interchangeably, these switches being free of stationary contacts and comprising movable contact arms and operating means therefor only, the mounting means being positioned to cooperate with mounting parts of S. P. switches or D. P. switches interchangeably, and convertible means for connecting certain of the stationary permanent contacts to any desired bus bar, the S. P. switches and the D. P. switches for interchangeable use with the unit having similar contact arms suitably positioned to engage the permanent stationary contacts of the unit, and having similar mounting means suitably positioned to cooperate with the permanent switch mounting means of the unit, interchange of switches and conversion of contact conections being effected from the front of the unit, and without requiring any access to the back, sides, or ends of the unit, and without requiring removal of the unit from its position over the bus bars.

33. In a lighting panel unit adapted to be mounted over a plurality of bus bars, a plurality of groups of circuit control parts therein, and a plurality of means to connect individual groups to individual ones of said bus bars, any one of the groups being connectable by the means to any one of the bus bars, as desired, only one group, however, being connectable by the means to any one bus bar at one time, the connection means being inaccessible for manipulation until the circuit through said unit is opened.

34. In a lighting panel unit adapted to be mounted over a plurality of bus bars, a body molded of insulating material and having integral therewith walls providing fuse-containing, cubical end compartments closed on four sides, switch containing, cubical intermediate compartments closed on four sides, and a central section of insulating material overlying the bus bars and containing means for connecting electrical parts of the unit to the bus bars, the interior of the central section being also a cubical compartment closed on four sides, and a cover closing the fronts of the fuse containing and switch containing compartments.

35. In a lighting panel unit adapted to be mounted over a plurality of bus bars, a body molded of insulating material and having integral therewith walls providing fuse-containing, cubical end compartments closed on four sides, switch containing, cubical intermediate compartments closed on four sides, and a central section of insulating material overlying the bus bars and containing means for connecting electrical parts of the unit to the bus bars, the interior of the central section being also a cubical compartment closed on four sides, and a cover closing the fronts of the fuse containing and switch containing compartments, the interior of the central section being permanently closed by a front wall integral therewith.

36. A panel board built up of a plurality of units, a trim plate surrounding them, the units being removable from the front of the board without disturbing the trim plate, the units also having convertible parts therein, accessible and operable from the front of the board for unit conversion, without disturbing the trim plate, and without requiring removal of the units from the board.

37. In a lighting panel unit adapted to be mounted over a plurality of bus bars, a pair of permanently mounted straps overlying said bus bars and connectable to any one of them, as desired, the straps having ends formed as stationary contacts for switches, other stationary permanently mounted contacts for switches, the contacts being positioned to receive the movable contact arms of stripped S. P. or D. P. switches interchangeably, these switches being free of stationary contacts and comprising movable contact arms and operating means therefor only, the S. P. and D. P. switches for interchangeable use with the unit having similar contact arms suitably positioned to engage the permanent stationary contacts of the unit.

38. In a lighting panel unit adapted to be mounted over a plurality of bus bars, a pair of permanently mounted straps overlying said bus bars and connectable to any one of them, as desired, the straps having ends formed as stationary contacts for switches, other stationary permanently mounted contacts for switches, the contact being positioned to receive the movable contact arms of stripped S. P. or D. P. switches interchangeably, these switches being free of stationary contacts and comprising movable contact arms and operating means therefor only, the S. P. and D. P. switches for interchangeable use with the unit having similar contact arms suitably positioned to engage the permanent stationary contacts of the unit, each of the straps having a row of bores therethrough alined with the bus bars.

39. In a cupshaped panel unit adapted to be mounted over a plurality of bus bars, together with a plurality of similar units to form a complete panel, an elongated body molded of insulating material and having end walls which together form the side walls of the panel, and having circuit control devices therein, open channels in the end walls of said units, the channels being open to the ends and back of the unit, apertures in the units connecting the channels with the cup shaped interior of the units and through which the terminals of cables which lie in the end wall channels pass into the units, and binding screws in the interior of the units for the terminals, the unit being removable from the front of the panel, with the cable ends attached thereto, without requiring access to the back, sides, or ends of the unit.

HARRISON J. L. FRANK.
CLARENCE T. HOLLINGSWORTH.